(12) United States Patent
Chou et al.

(10) Patent No.: US 7,651,231 B2
(45) Date of Patent: Jan. 26, 2010

(54) LIGHTING MODULE FOR USE IN A KEYPAD DEVICE

(75) Inventors: Li-Kun Chou, Taipei (TW); Pai-Chen Chieh, Taipei (TW); Yung-Fu Wu, Taipei (TW); Yu-Nan Liu, Taipei (TW)

(73) Assignee: Lite-On Technology Corp., Taipei (TW)

( * ) Notice: Subject to any disclaimer, the term of this patent is extended or adjusted under 35 U.S.C. 154(b) by 42 days.

(21) Appl. No.: 11/984,855

(22) Filed: Nov. 23, 2007

(65) Prior Publication Data

US 2008/0170381 A1    Jul. 17, 2008

(30) Foreign Application Priority Data

Nov. 24, 2006    (TW) .............................. 95220749 U

(51) Int. Cl.
*F21V 33/00*    (2006.01)

(52) U.S. Cl. .............................. 362/85; 362/24; 362/88

(58) Field of Classification Search .................... 362/24, 362/26, 27, 85, 86, 88; 200/310, 314
See application file for complete search history.

(56) References Cited

U.S. PATENT DOCUMENTS

| | | | | | |
|---|---|---|---|---|---|
| 2,365,864 | A | * | 12/1944 | Chapman | 362/24 |
| 5,249,104 | A | * | 9/1993 | Mizobe | 362/327 |
| 5,568,367 | A | * | 10/1996 | Park | 362/85 |
| 7,086,768 | B2 | * | 8/2006 | Suwa et al. | 362/85 |
| 7,222,993 | B2 | * | 5/2007 | Kikuchi et al. | 362/24 |

* cited by examiner

*Primary Examiner*—Y My Quach Lee
(74) *Attorney, Agent, or Firm*—Rosenberg, Klein & Lee

(57) ABSTRACT

A lighting module adapted for use in a keypad device includes a circuit substrate board, a transparent light guide plate stacked on the circuit substrate board, and at least one light emitting diode embedded in the light guide plate and connected electrically to the circuit substrate board. By having the light emitting diode embedded in the light guide plate, the overall thickness of the lighting module can be reduced to permit miniaturization.

6 Claims, 6 Drawing Sheets

US 7,651,231 B2

LIGHTING MODULE FOR USE IN A KEYPAD DEVICE

CROSS-REFERENCE TO RELATED APPLICATION

This application claims priority of Taiwanese Application No. 095220749, filed on Nov. 24, 2006.

BACKGROUND OF THE INVENTION

1. Field of the Invention

The invention relates to a lighting module, more particularly to a lighting module for use in a keypad device.

2. Description of the Related Art

In order that keys on a keypad can be easily identified in a relatively dark environment to facilitate operation of the same, a light source is generally provided behind each key such that light from the light source can pass through a transparent portion of the key to enable the user to discern and operate the keys. However, when applied to a portable electronic or communications device that has a large number of keys, such an arrangement would be conceivably expensive since a large number of light sources is required.

A more economical approach is, as described in U.S. Pat. No. 5,083,240, to provide a light guide plate which is disposed between a light source and keys on a keypad and which extends along the respective keys. The light from the light source is dispersed evenly to each of the keys by total reflection. The number of light sources is therefore considerably decreased, thereby reducing costs.

However, although the use of light guide plates can cut costs, the overall thickness of the device is increased, which goes against the current trend toward miniaturization of portable electronic or communications devices. Therefore, improvements on the structure of the device are required to keep up with the current trend and to enhance the market competitiveness of the device.

SUMMARY OF THE INVENTION

Therefore, an object of the present invention is to provide a thin-type lighting module adapted for use in a keypad device.

Another object of the present invention is to provide a lighting module that can effectively utilize light.

To achieve the aforementioned objects, the present invention provides a lighting module with a light emitting diode embedded in a transparent light guide plate so as to reduce the thickness of the lighting module.

In addition, the lighting module of the present invention may include a reflecting unit to reflect light emitted by the light emitting diode embedded in the light guide plate back into the light guide plate.

In an embodiment of the present invention, the light guide plate is formed with a through hole, and the light emitting diode is embedded in the through hole.

In an embodiment of the present invention, the reflecting unit is a reflecting sheet disposed on the light guide plate to reflect light radiated upwardly by the light emitting diode so as to enhance the light utilization efficiency.

In an embodiment of the present invention, the reflecting unit is in the form of a reflective layer formed on a transparent thin plate stacked on the light guide plate. The reflective layer may be a covering layer formed on the transparent thin plate by printing or coating.

In another embodiment of the present invention, the light guide plate is formed with a blind hole for receiving the light emitting diode.

In another embodiment of the present invention, the reflecting unit is a reflective layer formed on an upper surface of the light guide plate. The reflective layer is a covering layer formed on the upper surface of the light guide plate by printing or coating.

The light guide plate of this invention may be formed from polyethylene terephthalate.

The light emitting diode of this invention may be a chip type light emitting diode.

Thus, a lighting module adapted for use in a keypad device according to the present invention includes a circuit substrate board, a transparent light guide plate stacked on the circuit substrate board, at least one light emitting diode embedded in the light guide plate and connected electrically to the circuit substrate board, and a reflecting unit disposed on an upper surface of the light guide plate opposite to the circuit substrate board for reflecting light from the light emitting diode.

The present invention achieves effects of miniaturization and cost reduction by having the light emitting diode embedded in the light guide plate and connected electrically to the circuit substrate board.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
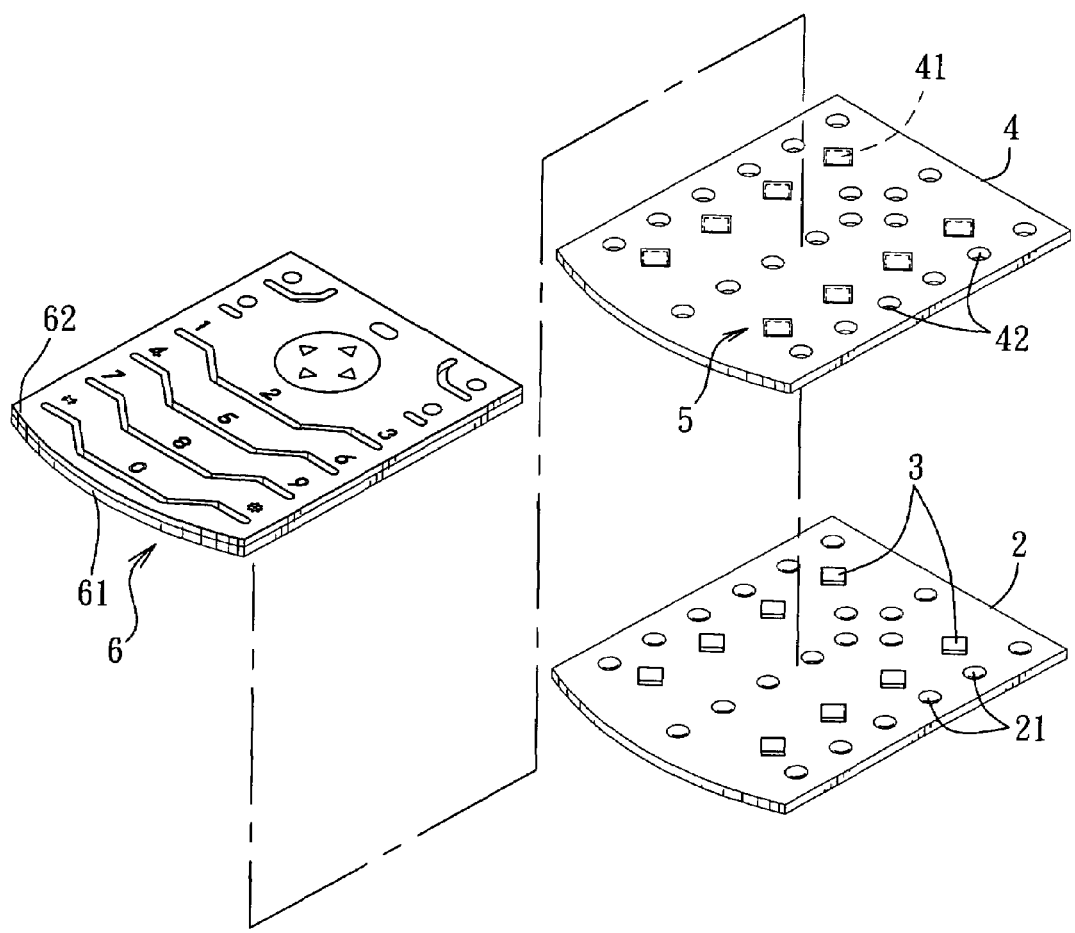
FIG. 1 is an exploded perspective view of the first preferred embodiment of a lighting module adapted for use in a keypad device according to the present invention.

Before the present invention is described in greater detail, it should be noted that like elements are denoted by the same reference numerals throughout the disclosure.

Figure 2:
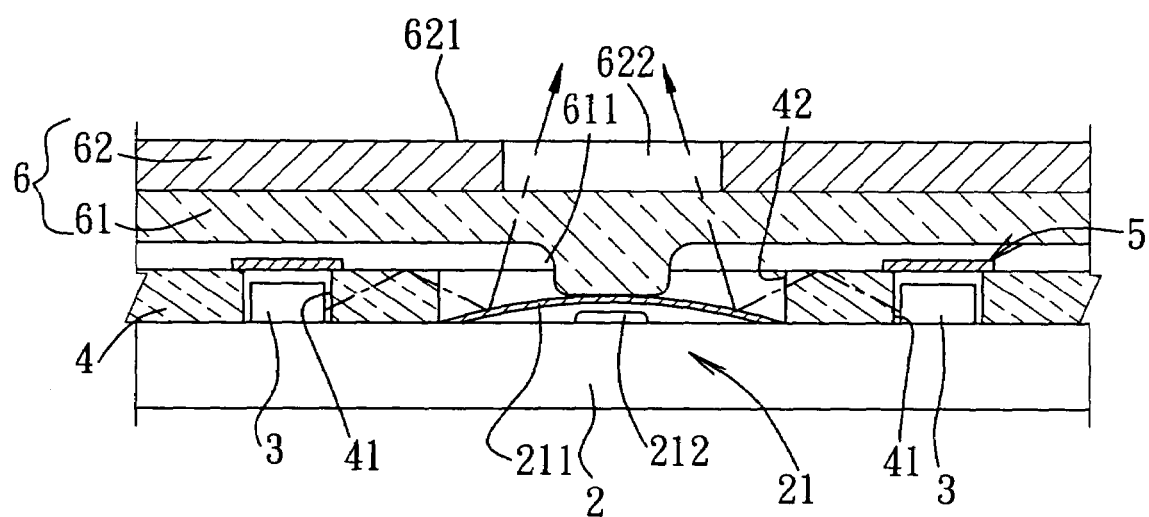
FIG. 2 is a schematic sectional side view of the first preferred embodiment in an assembled state.

Referring to FIGS. 1 and 2, the first preferred embodiment of a lighting module according to the present invention is adapted for use in a keypad device, and includes a circuit substrate board 2, a transparent light guide plate 4 stacked on the circuit substrate board 2, eight light emitting diodes 3 that are spacedly embedded in the light guide plate 4 and that are connected electrically to the circuit substrate board 2, and a reflecting unit 5 disposed on an upper surface of the light guide plate 4. In addition, to facilitate description of the relationship between the keypad device and the lighting module of the present invention, the lighting module of the present invention will be described in conjunction with a keypad unit 6 that is disposed above the light guide plate 4.

It is first noted that the term "embedded" as used herein means completely embedded or partly embedded.

The circuit substrate board 2 is a printed circuit board, and has an upper surface formed with a plurality of key switches 21. Each key switch 21 has a dome-shaped metal resilient plate 211, and a circuit contact pad 212 disposed in a receiving space defined by the metal resilient plate 211. When the metal resilient plate 211 is pressed downward to contact the circuit contact pad 212, electrical connection is established. In this embodiment, the key switches 21 are exemplified to be twenty-one in number, but may have various modifications depending on the functionality design of the keypad device in practice.

The transparent light guide plate 4 guides light emitted from the light emitting diodes 3, and is formed with eight through holes 41 that extend through upper and lower surfaces of the light guide plate 4 and that receive the corresponding light emitting diodes 3 therein. Furthermore, the through holes 41 are shaped and sized to correspond to the light emitting diodes 3 so as to reduce the spacing between the light emitting diodes 3 and the light guide plate 4, thereby enhancing the light utilization efficiency.

In addition, the light guide plate 4 is further formed with twenty-one circular switch holes 42 corresponding to the key switches 21. For the purpose of miniaturization, the light guide plate 4 is formed from polyethylene terephthalate (PET), which allows for the manufacture of the currently thinnest light guide plate, i.e., 0.18 mm. In addition, polymethyl methacrylate and polycarbonate can also be used.

For the purpose of miniaturization, relatively thin chip type light emitting diodes can also be used to serve as the light emitting diodes 3, and there are eight light emitting diodes 3 in this embodiment. In practice, the number of the light emitting diodes 3 can be modified depending on the overall design of the keypad device.

The reflecting unit 5 is provided to reflect light radiated upward by the light emitting diodes 3 so as to increase the amount of light entering the light guide plate 4, thereby enhancing the utilization efficiency of light. In this embodiment, the reflecting unit 5 includes eight reflecting sheets that are adhered to the upper surface of the light guide plate 4 to respectively cover the through holes 41. Preferably, the reflecting sheets are thin white sheets. Alternatively, at least the side of each reflecting sheet that confronts the light guide plate 4 is white in color.

Figure 3:
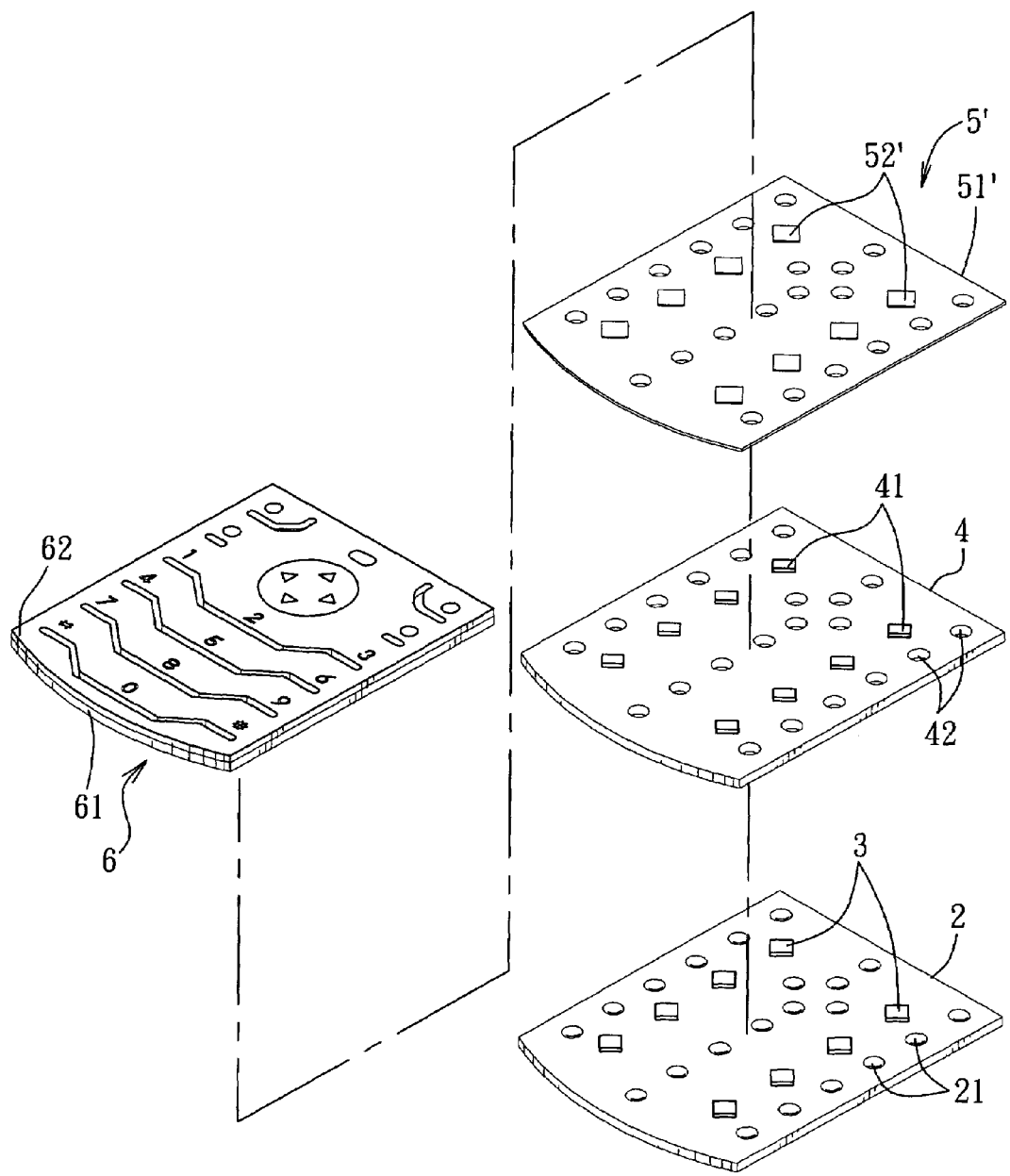
FIG. 3 is an exploded perspective view of the first preferred embodiment to illustrate another example of a reflecting unit thereof.
Figure 4:
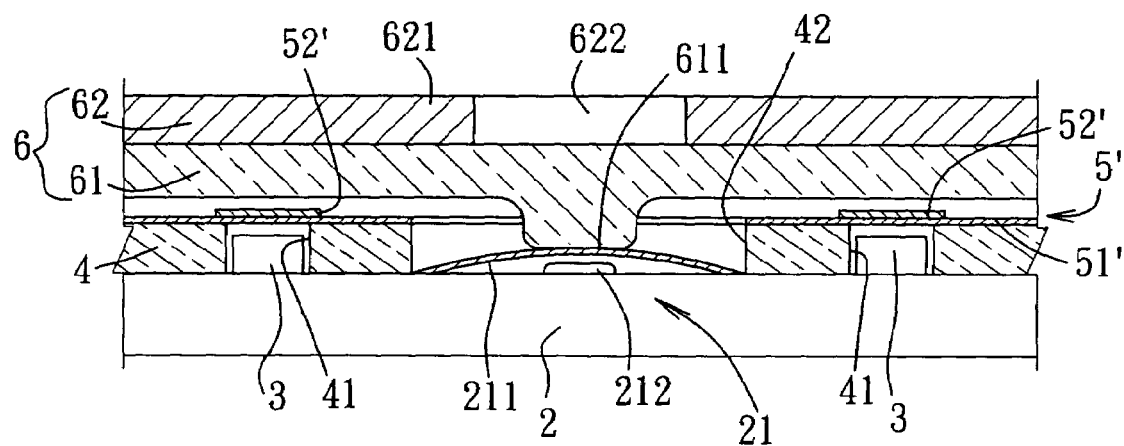
FIG. 4 is a schematic sectional side view of the embodiment of FIG. 3 in an assembled state.

FIGS. 3 and 4 show another example of the reflecting unit 5', which includes a transparent thin plate 51' stacked on the upper surface of the light guide plate 4, and eight reflective layers 52' that are spacedly arranged on an upper surface of the thin plate 51' to cover the respective light emitting diodes 3. The reflective layers 52' are formed by printing or applying a layer of white coating onto the upper surface of the thin plate 51'. It is noted that the reflective layers 52' are depicted as having an obvious thickness in FIG. 4 in order to facilitate illustration. In practice, the reflective layers 52' are very thin layers of coating.

Due to the provision of the reflective layers 52', the light emitted upward from the light emitting diodes 3 can be reflected to enhance the amount of light within the light guide plate 4.

The keypad unit 6 is disposed for pressing and operation by the user. It is noted that since there are various configurations of the keypad unit 6, only an example is given herein. Thus, in this embodiment, the keypad unit 6 is exemplified to include a transparent plastic pad 61 and a keypad 62 stacked on the plastic pad 61.

The transparent plastic pad 61 is formed from silicone material, and has twenty-one protrusions 611 projecting downward from a lower surface thereof to extend through the circular switch holes 42 in the light guide plate 4 so as to contact the key switches 21, respectively.

The keypad 62 is a planar metal plate, and defines a plurality of key regions 621 that correspond respectively to the protrusions 611. Furthermore, at least one through hole 622, which has the shape of a numeral or sign, is formed in each key region 621.

By embedding the light emitting diodes 3 in the through holes 41 in the light guide plate 4, by connecting the light emitting diodes 3 electrically to the circuit substrate board 2, and by providing the reflecting unit 5, 5' on the upper surface of the light guide plate 4 to cover the light emitting diodes 3, light from the light emitting diodes 3 is guided effectively through the light guide plate 4 to exit through the circular switch holes 42, and to propagate through the plastic pad 61 toward the through hole 622, thereby achieving effective light utilization and a thin profile.

Figure 5:
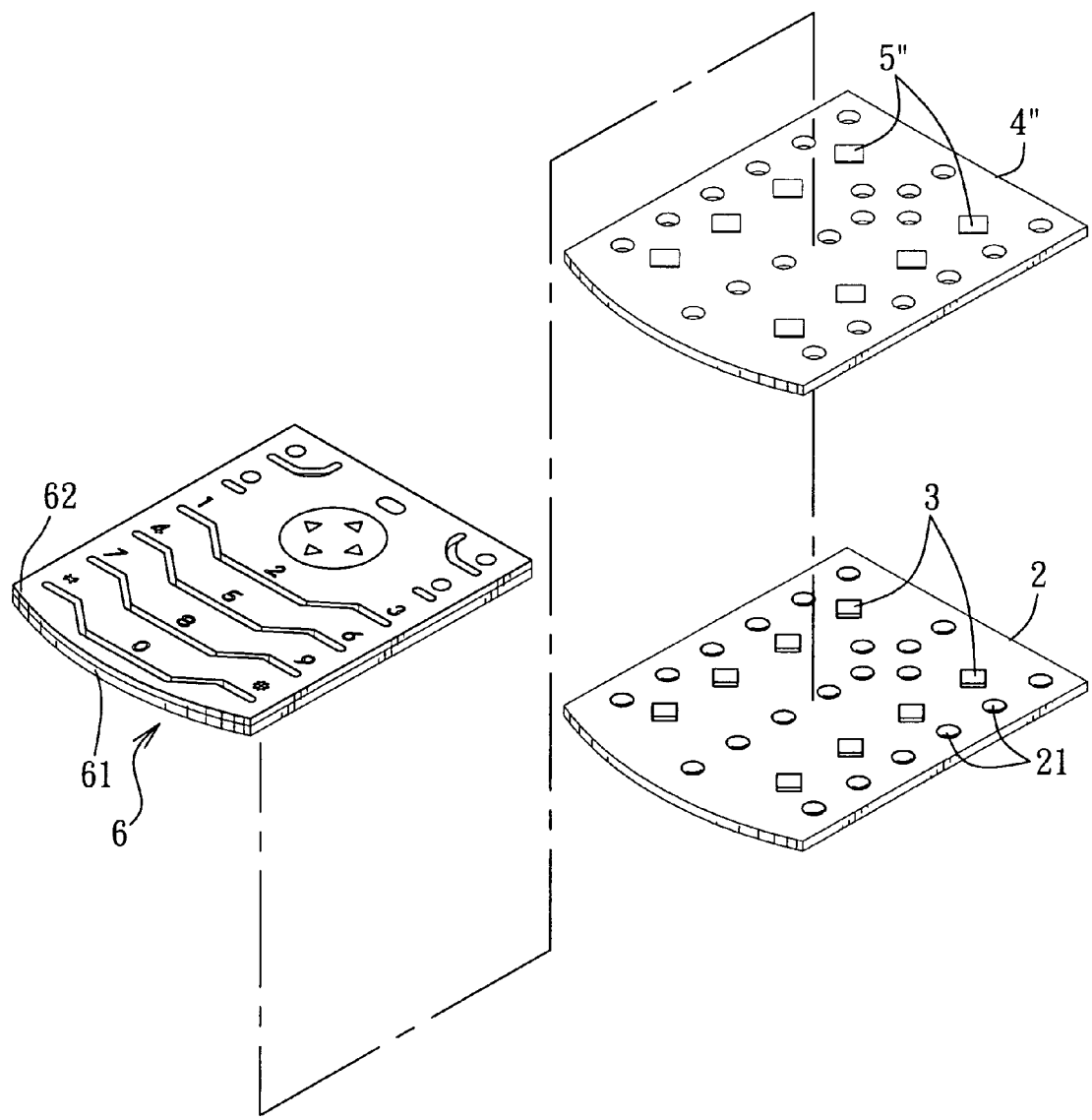
FIG. 5 is an exploded perspective view of the second preferred embodiment of a lighting module adapted for use in a keypad device according to the present invention.
Figure 6:
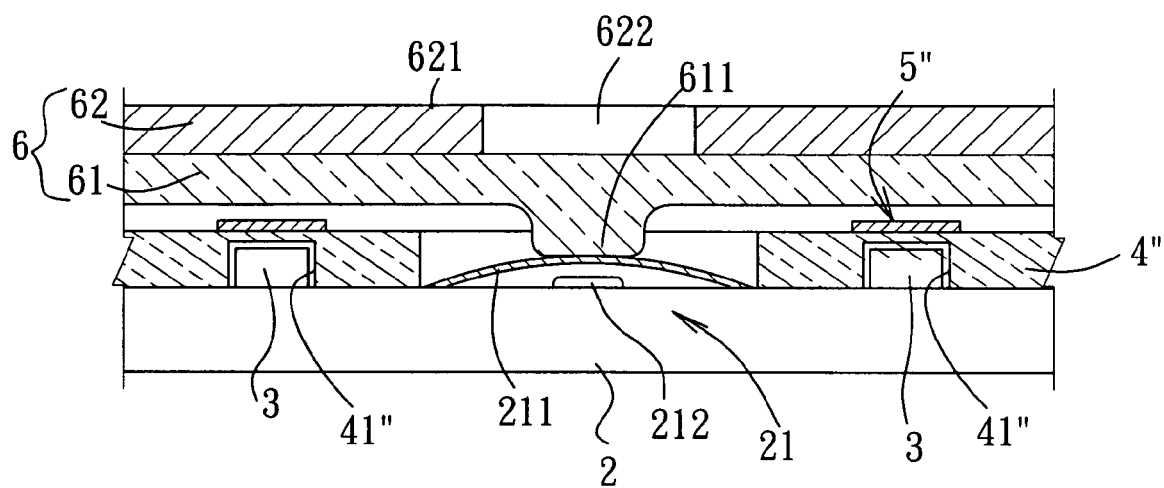
FIG. 6 is a schematic sectional side view of the second preferred embodiment in an assembled state.

FIGS. 5 and 6 show the second preferred embodiment of a lighting module according to the present invention. The circuit substrate board 2 and the light emitting diodes 3, as well as the keypad unit 6 of the keypad device, of this embodiment are substantially the same as those in the first preferred embodiment.

The difference resides in that the light guide plate 4" is formed with blind holes 41" that are recessed upward from the lower surface thereof. The blind holes 41" are shaped and sized to correspond to the light emitting diodes 3, respectively. Besides, the reflecting unit 5" includes eight reflective layers correspondingly formed on the upper surface of the light guide plate 4" to cover the light emitting diodes 3, respectively. As described hereinabove, the reflective layers can be formed by printing or applying a white coating onto the upper surface of the light guide plate 4". It is also noted that the reflective layers are depicted to have an obvious thickness in FIG. 6 while they are merely a very thin layer in practice.

In sum, by means of the light emitting diodes 3 that are embedded in the light guide plate 4, 4" and that are electrically connected to the circuit substrate board 2, and by means of the reflecting unit 5, 5' 5" that is provided on the upper surface of the light guide plate 4, 4" to reflect light from the light emitting diodes 3, the objectives of miniaturization and effective light utilization can be positively achieved.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A keypad device comprising a lighting module, a circuit substrate board that has an upper surface provided with a plurality of key switches, and a keypad unit that is disposed for pressing and operation by a user, said lighting module including:
   a transparent light guide plate stacked on said circuit substrate board and formed with a plurality of switch holes that correspond respectively in position to said key switches;
   at least one light emitting diode embedded in said light guide plate and connected electrically to said circuit substrate board; and
   a reflecting unit disposed on an upper surface of said light guide plate opposite to said circuit substrate board, and including a transparent thin plate that is stacked on said upper surface of said light guide plate, and at least one reflective layer that is formed on an upper surface of said transparent thin plate opposite to said light guide plate for covering said at least one light emitting diode;

wherein said keypad unit is disposed on top of said reflecting unit, and light from said at least one light emitting diode is reflected by said reflecting unit and guided through said light guide plate to exit through said switch holes and to propagate toward said keypad unit through said transparent thin plate of said reflecting unit.

2. The keypad device according to claim 1, wherein said reflective layer is a covering layer formed on said upper surface of said transparent thin plate.

3. The keypad device according to claim 1, wherein said light guide plate is formed with at least one through hole, said light emitting diode being embedded in said through hole.

4. The keypad device according to claim 1, wherein said light guide plate is formed with a blind hole that extends upward from a lower surface of said light guide plate confronting said circuit substrate board, said light emitting diode being embedded in said blind hole.

5. The keypad device according to claim 1, wherein said light guide plate is formed from polyethylene terephthalate.

6. The keypad device according to claim 1, wherein said light emitting diode is a chip type light emitting diode.

* * * * *